Patented Jan. 16, 1934

1,943,424

UNITED STATES PATENT OFFICE 1,943,424

RUBBER ADHESIVE

Walter W. Dunfield, Yonkers, N. Y., assignor to The Naugatuck Chemical Company, Naugatuck, Conn., a corporation of Connecticut No Drawing. Application October 24, 1931
Serial No. 570,983

11 Claims. (Cl. 87—17)

This invention relates to rubber adhesives, and more particularly to adhesives for uniting rubber to metal and other surfaces.

Heretofore various methods and materials have been employed for uniting rubber to metal and other surfaces. For example, an ordinary hard rubber cement has been applied to a sandblasted surface of metal, dried, and a sheet of rubber rolled thereon and the whole vulcanized to form a unit.

In the case of uniting rubber to irregularly shaped objects, as in rubber coating irregularly shaped metal objects, it is not commercially practicable to use a milled stock or other solid rubber such as a calendered sheet for the outer covering. In such cases it has been the practice to coat the metal or other surface with a solution of rubber in an organic solvent, dry the solvent and repeat the operations until the desired thickness of rubber coating may be applied directly to the base surface, if sufficiently adherent thereto, or, as in the case of metal surface, a hard rubber cement or other metal-to-rubber adhesive may be applied directly to the metal and the rubber coating from the rubber solvent cement applied over the metal-to-rubber adhesive, and vulcanized in the usual manner.

In the patent to Loomis and Stump No. 1,576,767, of March 16, 1926 a method of coating pipes has been described wherein latex is pumped through the pipes after assembly, the excess over that adhering to the interior drained away, air blown through the pipes to dry and effect a final coagulation of the latex, and then hot air blown through to effect a vulcanization of the rubber lining.

In the copending application of Parke H. Watkins, No. 307,062, filed Sept. 19, 1928, there is disclosed a method of coating metal and other articles by first applying, for example, to the metal surface a coating of metal-to-rubber adhesive such as layers of hard rubber cement and intermediate rubber cement and then applying over the dried metal-to-rubber adhesive a latex composition and coagulating the rubber in the latex by drying or by acid or other chemical coagulation.

This invention relates to rubber adhesives, more particularly to rubber adhesives which may be used to unite sheet rubber and the like to metal and other surfaces and which may also be used to unite rubber deposited from aqueous dispersions of rubber such as latex or artificial dispersions, or rubber deposited from rubber solvent cements, such as naphtha cement, to metal and other surfaces.

In my copending application No. 335,152, filed Jan. 25, 1929, I have disclosed and claimed a new adhesive for uniting rubber to metal and other surfaces comprising rubber that has been subjected to a melting temperature and kept in molten condition for a considerable period of time. It is kept at sufficient temperature for sufficient time to leave it in a fluid condition. As disclosed in the application, sulphur and appropriate accelerators are added to the "melted rubber" and a solvent cement made of the melted rubber and vulcanizing ingredients. This cement may be used to unite rubber to metal and other articles by spreading the cement over the surface of the article, drying, applying the rubber thereto, and vulcanizing the whole. However due to the low viscosity of a cement mixture of "melted rubber" and vulcanizing ingredients, it is sometimes advantageous to add to it a small amount of ordinary rubber cement to increase the viscosity of the mixture, and also to render the adhesives less liable to flow during the vulcanization operation.

In the present invention, I prepare an adhesive material, primarily for uniting rubber to metal and other surfaces, containing "melted rubber", "Newbrough rubber" and if desired a minor proportion of unmelted rubber. In the description and claims the term "melted rubber" is used to designate rubber that has been melted and kept in molten condition for a period of time as described in my copending application. The term "Newbrough rubber" is used to designate rubber that has been treated as described in the patent to John B. Newbrough No. 100,435 of March 1, 1870. The term "rubber" as applied to the material which is united to or coated on a metal or other surface, is to be interpreted broadly as calendered or other sheet rubber, rubber deposited from latex or other aqueous dispersions of rubber, or rubber deposited from a solvent cement.

Below is discussed the preparation of "melted rubber" and "Newbrough rubber".

*Preparation of "melted rubber"*

As one example of a method of preparation of "melted rubber", but without desiring to limit myself to the exact procedure outlined since many variations will occur to persons skilled in the art, the following method of preparation of melted rubber is included from my copending application No. 335,152:

"A portion of the rubber, which may be either broken down or unbroken down, is heated in a container preferably closed and provided with a long reflux. This heating process is carried on at a temperature of approximately 300° C., although it may be varied somewhat therefrom, the range of temperature being 180° C. to 350° C. This heating process may be carried on for a period of from 10 to 20 hours with successful results although the time found to be most suitable is approximately 18 hours."

Preparation of "Newbrough rubber"

The Newbrough rubber is prepared according to the disclosure of the Newbrough Patent No. 100,435, it being preferred not to prepare too hard a product. The following method of preparation has been found to give excellent results but it is to be understood that it is only included as one example of a method of preparing the product of the Newbrough patent, and it is not intended that "Newbrough rubber" shall be limited in any way to such specific method of preparation, since various other detailed methods of preparing Newbrough rubber will readily occur to persons skilled in the art.

Add slowly with constant stirring and under temperature control 363 grams of turpentine to 275 grams of concentrated sulphuric acid. The temperature should be kept at 60° C.–70° C. throughout the entire mixing which should take about 45 minutes. Heat the resulting liquid over a steam bath with occasional stirring for 5 to 7 hours, thus assuring complete reaction, between the sulphuric acid and turpentine.

Mill 4000 grams of rubber till it is thoroughly broken down. Add the above reagent slowly to the rubber while on the mixing mill, keeping the rolls of the mill as cool as possible. When the reagent is all milled into the rubber, the rubber mixture should be cut, and quickly and thoroughly mixed. It should then be removed from the mill in a thin layer and allowed to cool.

When thoroughly cooled, place the rubber mixture in a pan and then into an air heater at 40# steam pressure for about 5 hours. It is then removed and allowed to cool, after which it is washed on a regular rubber mill to remove any traces of acid. The mix is then dried either on a hot mill or at a low temperature in a heater. After drying, the mix is cooled and is then ready for use.

In the process of my invention, I prepare a solvent cement mixture of "melted rubber", "Newbrough rubber", and vulcanizing ingredients and apply this to the metal or other surface to which a rubber surface is to be united or made to adhere. The cement is dried and if a calendered sheet of rubber is to be united to the base, such sheet is rolled on over the dried cement and the whole vulcanized. If rubber from an aqueous dispersion is to be coated on the surface, such dispersion is applied to the dried cement in any convenient manner, as by brushing, spraying, or dipping and the rubber of the dispersion coagulated by drying or by treatment with acid and the whole is then vulcanized. Similarly, if rubber from a solution, such as a solvent solution, is to be coated on the surface, it is applied over the dried cement, dried, and the whole vulcanized. The vulcanization may take place in a mold, in open heat, under steam pressure, or in exhaust steam.

Due to the low viscosity of a cement mixture of "melted rubber" and Newbrough rubber, it is desirable, but by no means necessary, to add a minor proportion, say about 5% to 25% of the finished adhesive, of unmelted rubber to the "melted rubber" and Newbrough rubber cement. In this way, a heavier coat of cement can be applied and a more even coating will result. Also when pressure is applied during the final vulcanization of the article, which may be desirable where a calendered sheet is united to a metal surface, the addition of the unmelted rubber to the adhesive cement minimizes the chances of the rubber sheet being forced from place. The addition of the unmelted rubber which may be pale crepe or other crude rubber, also lessens the excessive tack due to the "melted rubber."

In preparing the cement mixture, the solvent, such as naphtha, may be added to the "melted rubber", Newbrough rubber, and crude or unmelted rubber, separately and the various solvent mixtures finally mixed together or the "melted rubber", Newbrough rubber and crude rubber may be mixed first and the solvent such as naphtha added to the mixture. Vulcanizing and compounding ingredients may be added as desired, to one or more of the solvent mixtures as first described above, or to the mixed rubbers before or after the solvent has been added as described in the second method above.

As has been discussed, the rubber to be united to the metal or other surface may be in the form of sheet rubber, aqueous dispersion of rubber, or so-called solution of rubber, that is rubber in an organic solvent. The rubber may also be unvulcanized, with or without vulcanizing ingredients, or vulcanized. The adhesive is primarily a vulcanizable adhesive so that if a completely vulcanized rubber is united to the metal or other surface by means of such adhesive, when the adhesive is vulcanized such rubber is apt to be over cured. However, with such coatings as rubber deposited from so-called "vulcanized latex", there is less chance for overcuring than in the case of a vulcanized sheet, since the "vulcanized latex" is in reality only partially vulcanized.

The adhesives of this invention are characterized in that solvent-free films prepared therefrom exhibit a high degree of tack, that said adhesives are adapted to yield a very strong bond between rubber and other surfaces without the application of pressure during vulcanization and without the use of an intermediate cement, and in that the temperature and time of cure may be varied widely without detriment to the adhesive qualities of the vulcanized products.

The adhesives of this invention may be used to unite rubber to metal, wood, hard rubber, soft rubber and other surfaces.

As specific illustrations of various ways of carrying out the invention, but without intention to limit the invention except as required by the prior art, the following examples of adhesive compositions are included:

Example 1

| | |
|---|---|
| "Melted rubber" | 50 grams |
| Newbrough rubber | 50 grams |
| Sulphur | 5 grams |
| Zinc oxide | 10 grams |
| Spray dried rubber | 15 grams |
| Dibenzylamine | 2 cc. |
| Carbon bisulphide | 2 cc. |

*Example 2*

| | Grams |
|---|---|
| "Melted rubber" | 50 |
| Newbrough rubber | 50 |
| Sulphur | 25 |
| Zinc oxide | 10 |
| Spray dried rubber | 10 |
| Tetramethyl thiuram disulphide | 1 |

*Example 3*

| | Grams |
|---|---|
| "Melted rubber" | 50 |
| Newbrough rubber | 50 |
| Sulphur | 10 |
| Zinc oxide | 10 |
| Spray dried rubber | 15 |
| Heptaldehyde-aniline condensation product | 3 |

*Example 4*

| | Grams |
|---|---|
| "Melted rubber" | 50 |
| Newbrough rubber | 50 |
| Sulphur | 5 |
| Zinc oxide | 10 |
| Tetramethyl thiuram disulphide | 1 |

*Example 5*

| | Grams |
|---|---|
| "Melted rubber" | 50 |
| Newbrough rubber | 50 |
| Sulphur | 50 |
| Zinc oxide | 10 |
| Tetramethyl thiuram disulphide | 1 |

In preparing adhesives, according to this invention, varying amounts of melted rubber and Newbrough rubber may be used. Equal proportions have been shown in the examples, but various other proportions may be used. For example an adhesive having the following composition has been found particularly applicable for bonding rubber to wood:

*Example 6*

| | Grams |
|---|---|
| "Melted rubber" | 60 |
| Newbrough rubber | 40 |
| Sulphur | 5 |
| Zinc oxide | 10 |
| Spray dried rubber | 20 |
| Tetramethyl thiuram disulphide | 1 |

Various other proportions, particularly in the range from 25 parts of "melted rubber" and 75 parts of Newbrough rubber, to 75 parts of "melted rubber" and 25 parts of Newbrough rubber, are excellent for the purposes of the invention.

The crude rubber in some of the above examples is shown as spray dried rubber, but other forms of unmelted rubber such as pale crepe, smoked sheet and so forth may be used. The crude rubber preferably ranges from 5 to 25% of the adhesive, but other proportions may be used, and as has been described and shown in the example, the crude rubber may be omitted altogether, if desired. Various other vulcanizing and compounding ingredients than those shown may obviously be added to the adhesive mixture as desired.

While the invention has been described in detail, it is not intended to so limit it, inasmuch as the proportions of ingredients making up the adhesive, the process of preparing the various ingredients, and the process of combining the ingredients to form the adhesive may all be varied as will be well understood by those skilled in the art. Therefore it is not intended to limit my invention otherwise than by the prior art and the scope of the following claims.

Having thus described my invention, what I claim and desire to protect by Letters Patent is:

1. An adhesive material comprising "melted rubber" and Newbrough rubber.

2. An adhesive material comprising "melted rubber", Newbrough rubber, and unmelted rubber.

3. A material for bonding rubber to metal and other surfaces comprising "melted rubber", Newbrough rubber and vulcanizing ingredients.

4. A material for bonding rubber to metal and other surfaces comprising "melted rubber", Newbrough rubber, crude rubber, and vulcanizing ingredients.

5. An adhesive compound comprising "melted rubber", Newbrough rubber, a solvent and vulcanizing ingredients.

6. An adhesive compound comprising "melted rubber", Newbrough rubber, unmelted rubber, a solvent and vulcanizing ingredients.

7. An adhesive material comprising "melted rubber", Newbrough rubber, and a minor proportion of unmelted rubber.

8. An adhesive material comprising approximately equal proportions of "melted rubber" and Newbrough rubber.

9. An adhesive material containing "melted rubber" and Newbrough rubber in the range from 25 parts of "melted rubber" and 75 parts of Newbrough rubber, to 75 parts of "melted rubber" and 25 parts Newbrough rubber.

10. An adhesive material containing "melted rubber" and Newbrough rubber in the range from 25 parts of "melted rubber" and 75 parts of Newbrough rubber, to 75 parts of "melted rubber" and 25 parts Newbrough rubber, and a minor proportion of unmelted rubber.

11. An adhesive material comprising approximately equal proportions of "melted rubber" and Newbrough rubber, and a minor proportion of unmelted rubber.

WALTER W. DUNFIELD.